United States Patent [19]

Spangler et al.

[11] Patent Number: 4,681,603
[45] Date of Patent: Jul. 21, 1987

[54] FEED GAS SATURATION SYSTEM FOR STEAM REFORMING PLANTS

[75] Inventors: Harvey D. Spangler, Fort Dodge, Iowa; Kenneth V. Lamb, Monrovia, Calif.

[73] Assignees: Kinetics Technology International Corporation, Monrovia, Calif.; Farmland Industries, Corporation, Kansas City, Mo.

[21] Appl. No.: 829,020

[22] Filed: Feb. 13, 1986

[51] Int. Cl.4 .............................................. B01D 47/06
[52] U.S. Cl. .......................................... 55/27; 55/39; 55/42; 55/51; 55/222; 55/228; 55/257 R; 55/257 HE
[58] Field of Search .................. 55/27, 39, 42, 49, 51, 55/222, 228, 257 R, 257 HE

[56] References Cited

U.S. PATENT DOCUMENTS

| | | | |
|---|---|---|---|
| 1,800,217 | 4/1931 | Jacobus | 55/39 |
| 3,026,969 | 3/1962 | Bracone et al. | 55/42 |
| 3,210,912 | 10/1965 | Peake et al. | 55/39 |
| 3,542,121 | 11/1970 | Kaartinen | 165/1 |
| 3,613,333 | 10/1971 | Gardenier | 55/228 |
| 3,655,172 | 4/1972 | Ingels | 261/130 |
| 3,762,394 | 10/1973 | Newcomer | 55/222 |
| 3,839,849 | 10/1974 | Maniya | 55/228 |
| 3,915,222 | 10/1975 | Hull | 165/111 |
| 4,166,799 | 9/1979 | Giacobbe | 252/182 |
| 4,299,561 | 11/1981 | Stokes | 432/28 |
| 4,349,358 | 9/1982 | Tarancon | 55/89 |

Primary Examiner—Frank Sever
Attorney, Agent, or Firm—William W. Haefliger

[57] ABSTRACT

A process for the recovery of low-level heat in steam reforming plants by saturating a hydrocarbon gas feed stock with process condensate in a system comprising:
(a) injection of process condensate through multiple nozzles into a tubular coil containing multiple streams of hydrocarbon gas feedstock;
(b) vaporization of all or part of process condensate by the concurrent heating of the two-phase mixture of hydrocarbon feedstock and liquid in the tubular coil by heat transfer from a low-level heat source such as reformer furnace flue gas or shift reactor effluent;
(c) separation of the saturated hydrocarbon gas from any excess liquid condensate, with delivery of the saturated hydrocarbon gas to a steam reforming unit and recycle of excess liquid condensate to the process condensate system.

16 Claims, 6 Drawing Figures

FEED GAS SATURATION SYSTEM FOR STEAM REFORMING PLANTS

BACKGROUND OF THE INVENTION

1. Field of Invention

This invention relates generally to a process for recovery of low-level heat in steam reforming plants, or other systems and more specifically concerns effecting such heat recovery by saturating a hydrocarbon feed stock with process condensate.

2. Description of the Prior Art

The commercial application of steam reforming for the production of hydrogen, ammonia, methanol, and other products involves the catalytic reaction of a hydrocarbon feedstock with steam to form a mixture of hydrogen, carbon monoxide, carbon dioxide, water vapor, and residual hydrocarbons. Steam for this "reforming" reaction has typically been supplied from boilers utilizing treated boiler feedwater. The mixture of gases produce by the catalytic reaction are treated in various downstream processes which include cooling in which the water vapor condenses and is separated from the gas stream. This condensed water vapor is the "process condensate" which is typically contaminated with carbon dioxide and sometimes other compounds such as methanol and ammonia which are formed in the processes downstream of the catalytic reforming reaction. This condensate has typically been sent to a purifying system or "stripper" to remove the carbon dioxide and other contaminants, after which it is re-used as feed water to the plant boilers.

Recent technology has incorporated systems in which the process condensate is heated and sprayed into a packed tower or other vessel to saturate the hydrocarbon gas feedstock to the plant. This type of system can recover low level heat only to the extent allowed by liquid phase heating of the process condensate, and a temperature difference must exist both between the heat source and the condensate liquid and between the condensate liquid and the hydrocarbon gas feedstock.

SUMMARY OF THE INVENTION

An object of the present invention is to provide a process in which the maximum amount of heat can be recovered from low level heat sources in a steam reforming plant, such as reformer furnace flue gas, or shift reactor effluent, by saturating hydrocarbon feedstock with process condensate. Other objects and advantages of this invention will become apparent as well.

A method of saturating hydrocarbon feedstock with process condensate without requiring a separate packed tower or other vessel for the evaporation of condensate has not yet been discovered. Existing methods all require two temperature differences; between a heat source and the process condensate and between the process condensate and the hydrocarbon feedstock. The present invention requires only one temperature difference in the system and thus allows the maximum extent of low-level heat recovery in a steam reforming plant.

The invention involves:

(a) injection of process condensate as through multiple nozzles into a tubular coil containing multiple streams of hydrocarbon gas feedstock;

(b) vaporization of all or part of the process condensate by the concurrent heating of the two-phase mixture of hydrocarbon feedstock and liquid in the tubular coil by heat transfer from a low-level heat source such as reformer furnace flue gas or shift reactor effluent;

(c) separation of the saturated hydrocarbon gas from excess liquid condensate, with the delivery of the saturated hydrocarbon gas to a steam reforming unit and recycle of excess liquid condensate to the process condensate system. Due to the concurrent heating of hydrocarbon feedstock and process condensate in "b" above, no temperature difference between condensate and feedstock is required for saturation.

Additional important steps, and features will appear from the description and claims, as appear below.

These and other objects and advantages of the invention, as well as the details of an illustrative embodiment, will be more fully understood from the following specification and drawings, in which:

DRAWING DESCRIPTION

DETAILED DESCRIPTION

Figure 1:
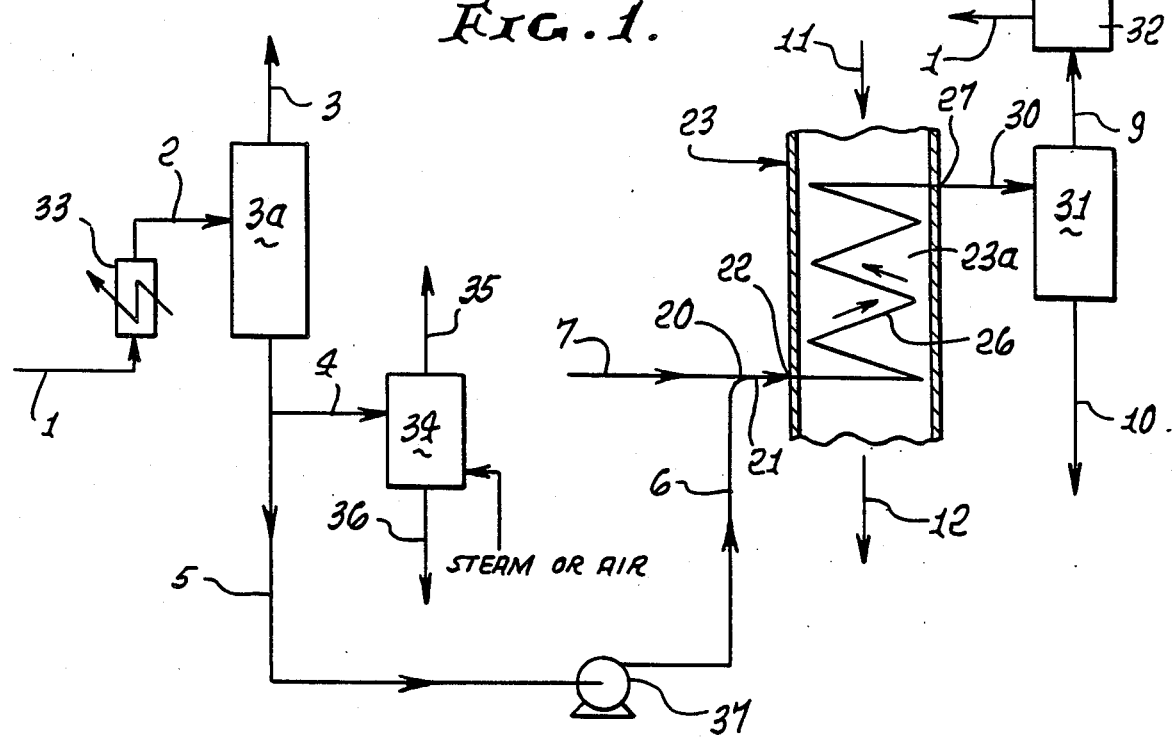
FIGS. 1–4 are process flow diagrams.
Figure 5:
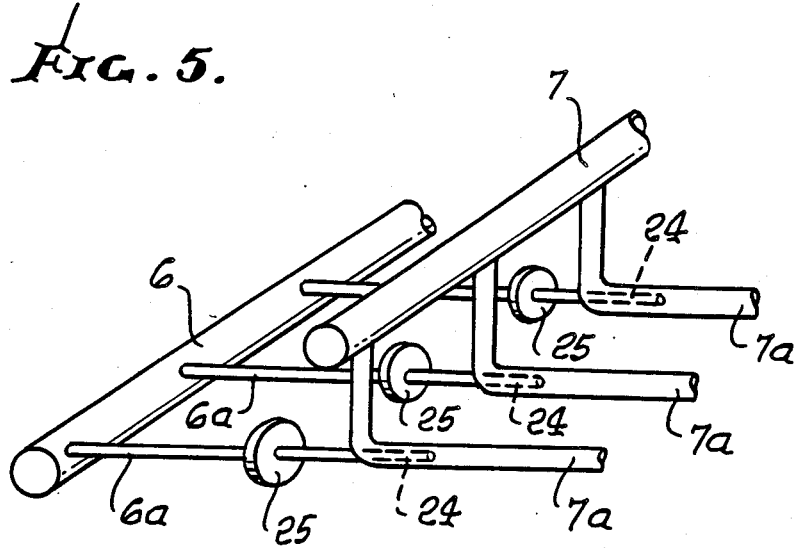
FIG. 5 is a mixing control diagram.
Figure 6:
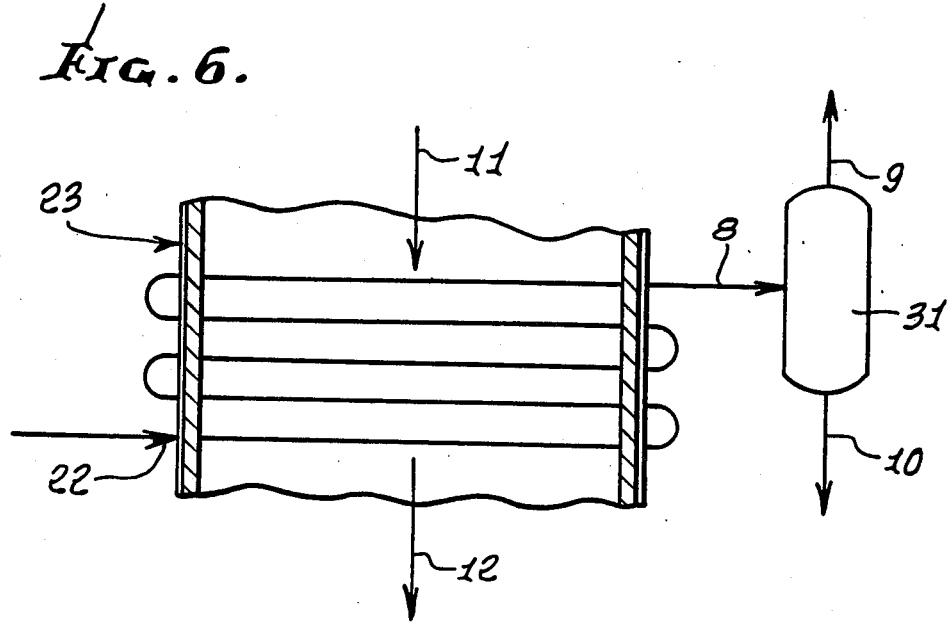
FIG. 6 is in elevation showing a tubular coil heat exchanger, with input and output connections.

Referring first to FIG. 1, a stream of natural gas, as from a compressor, pipeline, or cold desulfurizer, is fed at 7 for mixing at 20 with a high pressure condensate stream 6; and the resultant mixture is fed at 21 to input 22 of heat exchanger 23. The mixing is best effected by injecting the condensate through nozzles into multiple streams of the input feed gas. FIG. 5 shows one such method employing multiple nozzles 24 projecting into natural gas lines 7a fed from manifold 7. Condensate is fed from manifold 6 and via lines 6a to the injection nozzles, as via control valves or orifice plates 25 in lines 6a. Lines 7a connect with coil or coils 26.

Referring again to FIG. 1, the two-phase mixture fed to the heat exchanger at 21 is passed through a metal coil (or coils) 26 upwardly within the heat exchange interior zone 23a, to exit the exchanger at outlet 27. Coil 26 may typically consist of stainless steel, or other alloy to avoid acidic attack ($CO_2$ in condensate, and sulfur oxides in flue gas). A low temperature level fluid (gaseous) stream 11 (as for example combustion products flue gas) is passed downwardly through the heat exchanger, for heat transfer from stream 11 through the coil wall into the two-phase mixture flowing within the coil, thereby to vaporize process condensate and to saturate the hydrocarbon feed gas in the mixture. Stream 11 may alternatively consist for example of low temperature gas from a pipeline or compressor, or following a carbon bed or sponge iron desulfurizer.

The effluent from the heat exchanger is passed at 30 to a separator 31, wherein the saturation hydrocarbon is separated from the excess liquid condensate. The saturated gas is thus passed at 9 to a steam freforming unit, indicated at 32; and the excess condensate is recycled at 10 for mixing with input feed gas. Also shown in FIG. 1 is the fed at 1 of synthesis gas typically consisting of 40–60% hydrogen, 20–30% water vapor, 10–20% carbon dioxide, 1–2% methane, 0.5–1% carbon monoxide, and 0–30% nitrogen, with traces of other elements such as argon and helium) from the steam reformer plant to cooler 33, the cooled gas then fed at 2 to separator 3a. In the latter, the condensate consisting of water plus typically 0.1% each of carbon dioxide, ammonia, and methanol is removed from the gas, the dried syngas gas recovered for flow at 3 to the user. Process condensate is divided into streams 4 and 5, side steam 4 passing to stripper 34 wherein it is mixed with input steam or air. Stripped hydrocarbon overheads are delivered to atmosphere or flare, as at 35, and liquid fed at 36 to boiler feed water system.

Stream 5 is fed to booster pump 37, which raises the liquid stream 6 pressure to about 550–600 psig.

The following table indicates various stream pressures and temperatures, regarded as critical, as an example:

TABLE I

| Stream Number | Description | Typical Temp. | Typical Pressure |
|---|---|---|---|
| 1 | Synthesis gas from Reforming plant | 200° F.–400° F. | 380–400 psig |
| 2 | Cooled syngas to raw gas separator | 100° F.–150° F. | 370–390 psig |
| 3 | Dry syngas to user | 100° F.–150° F. | 360–380 psig |
| 4 | Process condensate stripper | 100° F.–150° F. | 360–380 psig |
| 5 | Process condensate to booster pump | 100° F.–150° F. | 360–380 psig |
| 6 | High pressure condensate | 100° F.–150° F. to saturator | 550–600 psig |
| 7 | Natural gas from compressor, etc. | 100° F.–250° F. | 550–600 psig |
| 8 | Wet saturated gas to knockout pot 31 | 360° F.–410° F. | 530–580 psig |
| 9 | Dry saturated gas to reforming plant | 360° F.–410° F. | 530–580 psig |
| 10 | Excess condensate to stripper | 360° F.–410° F. | 530–580 psig |
| 11 | Low temperature flue gas heat source | 350° F.–650° F. | −5 to −8″ W.G. |
| 12 | Flue gas after heat recovery | 240° F.–300° F. | −7 to −11″ W.G. |

Prior syngas production processes are disclosed for example in U.S. Pat. Nos. 3,442,613, 4,312,851 and 4,375,363.

Figure 2:
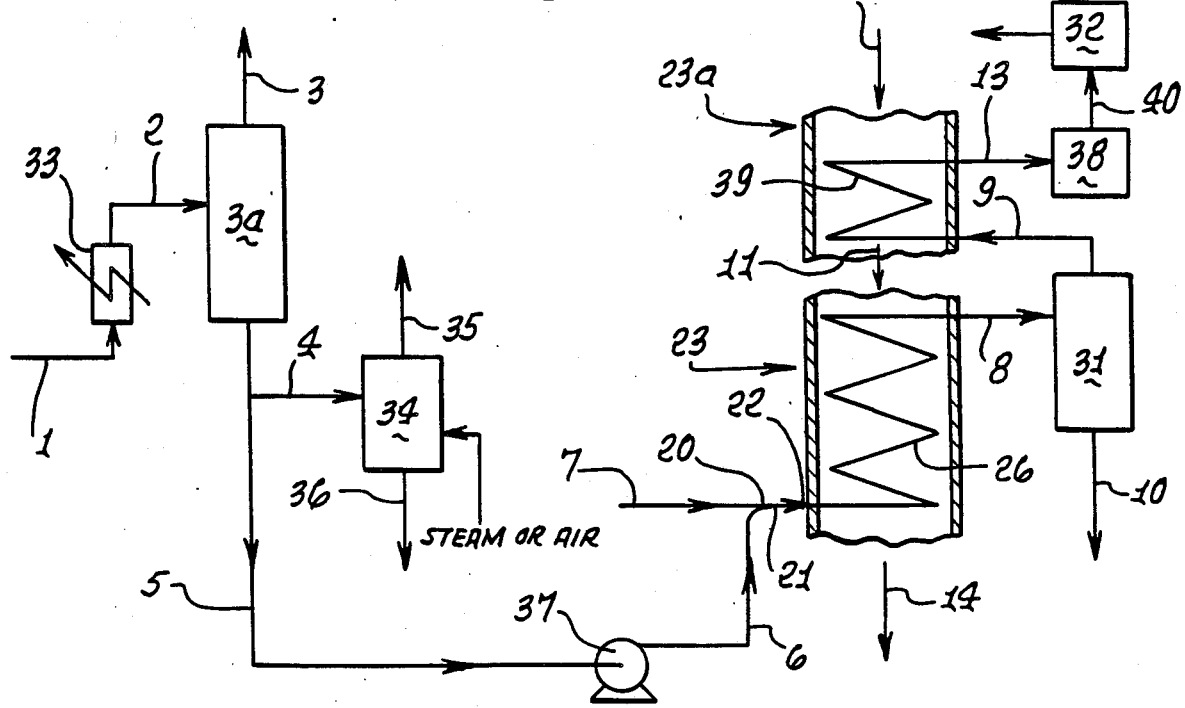

The system and process shown in FIG. 2 is like that of FIG. 1, providing for saturation of natural gas feedstock in a steam reforming plant, except that the dry saturated gas delivered at 9 is passed to a high temperature desulfurizer 38, such as a zinc oxide bed, and then to the reforming unit 32, at 40. For this purpose, the gas stream at 9 is passed to coil 39 in an upper portion 23a of the heat exchanger 23. Heat is transferred to the gas in the coil from the medium temperature flue gas stream 12 entering the exchanger, thereby to raise the temperature of the gas stream 9 to between 500° F. and 750° F., in exit stream 13 flowing to desulfurizer 38. Gas flowing at 40 to the reformer plant is substantially sulfur free. Note that hotter gas stream 12 is delivered from exchanger 23a to become lower temperature gas 11 in exchanger 23, for enhancing efficiency of heat transfer to fluid in coil 26.

The following table indicates various FIG. 2 stream pressure and temperature critical parameters, as an example or examples:

TABLE 2

| Stream Number | Description | Typical Temp. | Typical Pressure |
|---|---|---|---|
| 1 | Synthesis gas from reforming plant | 200° F.–400° F. | 380–400 psig |
| 2 | Cooled syngas to raw gas separator | 100° F.–150° F. | 370–390 psig |
| 3 | Dry syngas to user | 100° F.–150° F. | 360–380 psig |
| 4 | Process condensate to stripper | 100° F.–150° F. | 360–380 psig |

TABLE 2-continued

| Stream Number | Description | Typical Temp. | Typical Pressure |
|---|---|---|---|
| 5 | Process condensate to saturator | 100° F.–150° F. | 360–380 psig |
| 6 | High pressure condensate to saturator | 100° F.–150° F. | 560–610 psig |
| 7 | Natural gas from compressor, etc. | 100° F.–250° F. | 560–610 psig |
| 8 | Wet saturated gas to knockout pot | 360° F.–410° F. | 540–590 psig |
| 9 | Dry saturated gas to preheat coil | 360° F.–410° F. | 540–590 psig |
| 10 | Excess condensate to stripper | 360° F.–410° F. | 540–590 psig |
| 11 | Low temperature flue gas | 350° F.–650° F. | −4 to −8″ W.G. |
| 12 | Medium temperature flue gas | 600° F.–800° F. | −3 to −6″ w.g. |
| 13 | Hot saturated gas to hot desulfurizer | 500° F.–750° F. | 530–580 psig |
| 14 | Flue gas after heat recovery | 240° F.–300° F. | −7 to −11″ W.G. |

Figure 3:
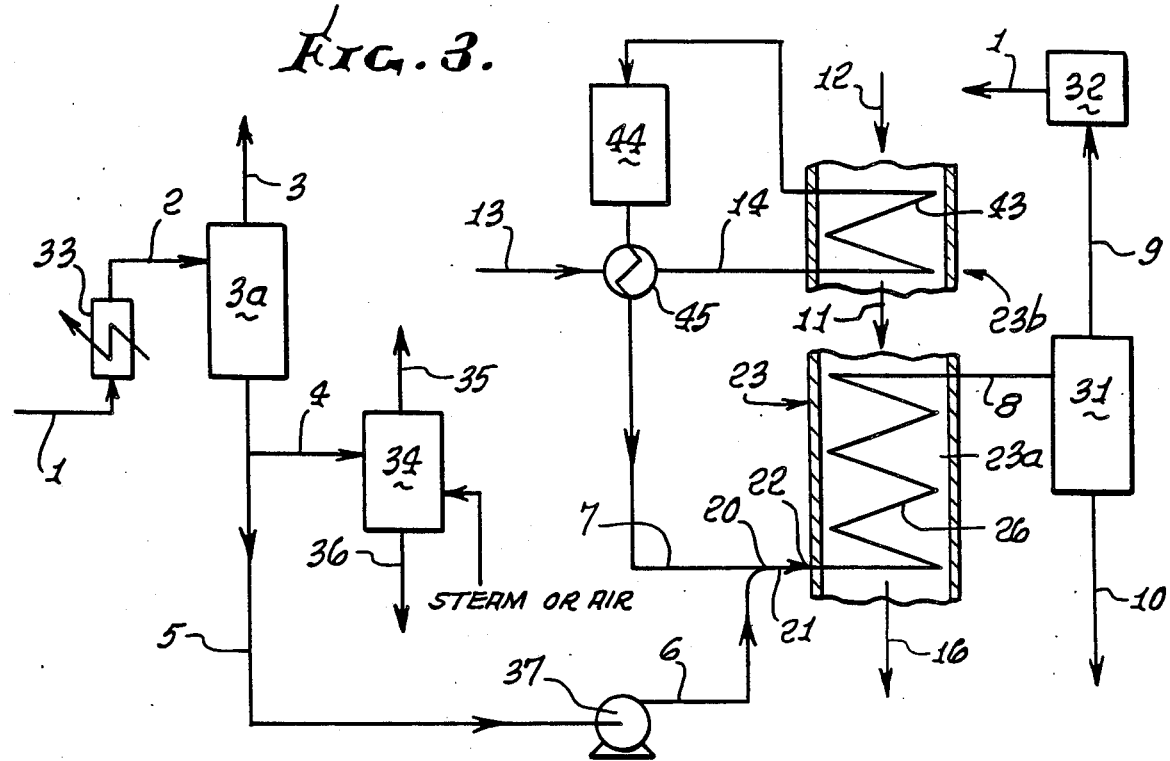

The system and process shown in FIG. 3 is like that of FIG. 1, providing for saturation of natural gas feestock in a steam reforming plant, except that the hydrocarbon feed gas at 7 has been subjected to prior desulfurization. As indicated, the feed gas is passed at 14 to a coil 43 in an upper portion 23b of heat exchanger 23. Heat is therein transferred from the first fluid stream 12, at medium temperature, to the feed gas in coil 43. The pre-heated feed gas is then passed at 15 to zinc oxide bed desulfurizer 44, wherein sulfur is removed. The de-sulfurized feed gas is then passed at 7 to the mixer. Also, heat in gas stream 7 may be transferred to gas stream 13, in a heat exchanger 45, as indicated, for increased efficiency by pre-heat in stream 14.

The following table indicates various FIG. 3 stream pressure and temperature critical parameters:

TABLE 3

| Stream Number | Description | Typical Temp. | Typical Pressure |
|---|---|---|---|
| 1 | Synthesis gas from reforming plant | 200° F.–400° F. | 380–400 psig |
| 2 | Cooled syngas to raw gas separator | 100° F.–150° F. | 370–390 psig |
| 3 | Dry syngas to user | 100° F.–150° F. | 360–380 psig |
| 4 | Process condensate to stripper | 100° F.–150° F. | 360–380 psig |
| 5 | Process condensate to booster pump | 100° F.–150° F. | 360–380 psig |
| 6 | High pressure condensate to saturator | 100° F.–150° F. | 550–600 psig |
| 7 | Natural gas from $Z_nO$ effluent cooler | 250° F.–400° F. | 550–600 psig |
| 8 | Wet saturated gas to knockout pot 31 | 360° F.–410° F. | 530–580 psig |
| 9 | Dry saturated gas to reforming plant | 360° F.–410° F. | 530–580 psig |
| 10 | Excess condensate to stripper | 360° F.–410° F. | 530–580 psig |
| 11 | Low temperature flue gas | 350° F.–650° F. | −4″ to −8″ W.G. |
| 12 | Medium temperature flue gas | 600° F.–800° F. | −3″ to −6″ W.G. |
| 13 | Natural gas from pipeline or compressor | 100° F.–250° F. | 570–620 psig |
| 14 | Hot natural gas to preheat coil | 250° F.–550° F. | 565–615 psig |
| 15 | Hot natural gas to desulfurizer | 550° F.–750° F. | 560–610 psig |
| 16 | Flue gas after heat recovery | 240° F.–300° F. | −7″ to −11″ W.G. |

Figure 4:
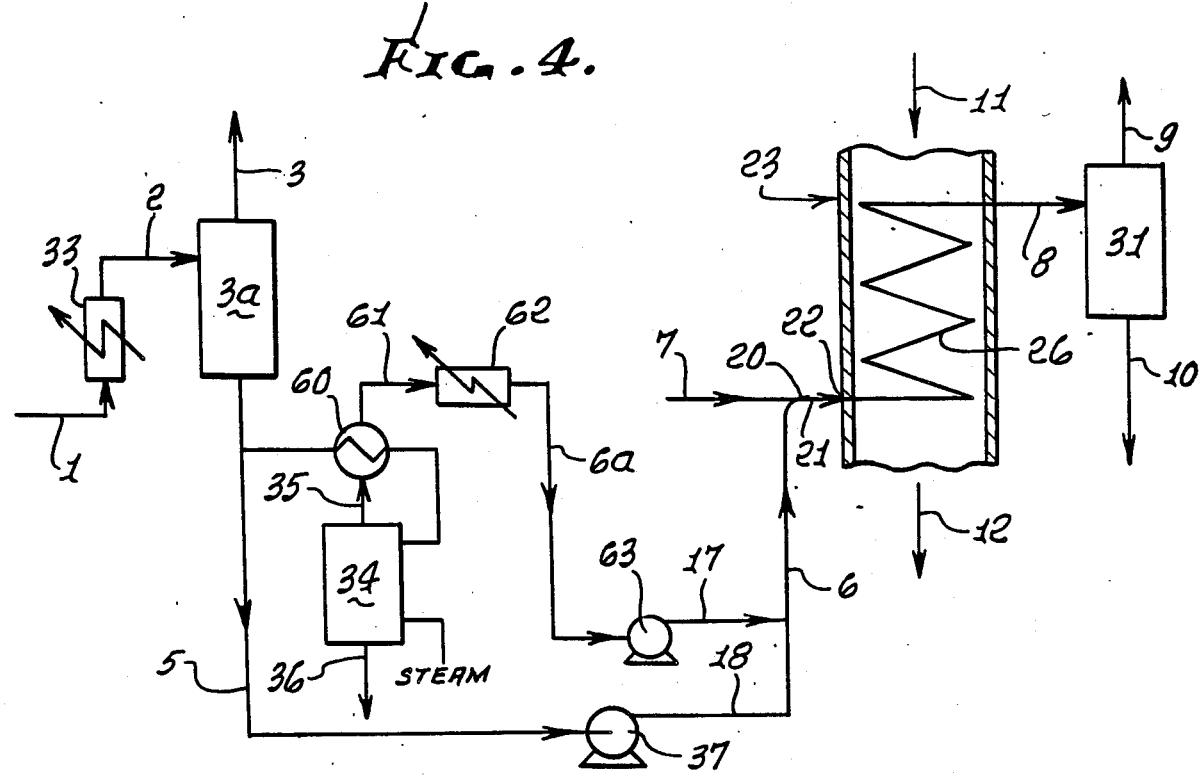

The system and process shown in FIG. 4 is also like that of FIG. 1, providing for saturation of natural gas, except that the liquid condensate fed at 6 to the mixing zone 20 is supplemented by condensed hydrocarbon overheads from the condensate stripper 34, this step being applicable to the processes of any of FIGS. 1-3. This eliminates emission of stripper overheads to the environment.

As illustrated the stripper overheads at 35 are passed via heat exchanger 60, line 61, cooler 62, line 16, booster pump 63, and line 17 to line 6, to supplement the condensate input to line 6 via line 5, booster pump 37 and line 18.

The following table indicates various stream pressures and temperatures, regarded as critical, as an example or examples.

TABLE 4

| Stream Number | Description | Typical Temp. | Typical Pressure |
|---|---|---|---|
| 1 | Synthesis gas from reforming plant | 200° F.–400° F. | 380–400 psig |
| 2 | Cooled syngas to raw gas separator | 100° F.–150° F. | 370–390 psig |
| 3 | Dry syngas to user | 100° F.–150° F. | 360–380 psig |
| 4 | Process condensate to stripper exchanger | 100° F.–150° F. | 360–380 psig |
| 5 | Process condensate to booster pump | 100° F.–150° F. | 360–380 psig |
| 6a | Condensed overheads to booster pump | 150° F.–250° F. | 20–60 psig |
| 7 | Natural gas from compressor, etc. | 100° F.–250° F. | 550–600 psig |
| 8 | Wet saturated gas to knockout pot 31 | 360° F.–410°F. | 530–580 psig |
| 9 | Dry saturated gas to reforming plant | 360° F.–410° F. | 530–580 psig |
| 10 | Excess condensate to stripper | 360° F.–410° F. | 530–580 psig |
| 11 | Low temperature flue gas | 350° F.–650° F. | −5" to −8" w.g. |
| 12 | Flue gas after heat recovery | 240° F.–300° F. | −7" to −11" W.G. |
| 17 | Condensed overheads to saturator | 150° F.–250° F. | 550–600 psig |
| 18 | Process condensate to saturator | 100° F.–150° F. | 550–600 psig |

As used herein, the term "process condensate" shall be understood to comprise boiler feedwater as one component, or as the only component.

We claim:

1. The method of recovering low level heat from a low or medium temperature first fluid stream, in conjuntion with operation of a process employing input hydrocarbon feed gas and providing process effluent separable into process condensate and dry gas, the steps that include: maximizing heat recovery from low level heat sources in systems having only one temperature difference, by saturating hydrocarbon feedstock with process condensate, by (a) mixing said condensate with said input feed gas and flowing the resultant two-phase mixture through a heat exchanger, (b) flowing said low or medium temperature fluid stream through said heat exchanger and transferring heat from said steam through a wall to said mixture, thereby to vaporize process condensate and to saturate the hydrocarbon feed gas in the mixture, said low or medium temperature fluid stream consisting of a flue gas at a temperature or temperatures between 350° and 800° F., (c) and subsequently separating the saturated hydrocarbon feed gas from excess liquid condensate, whereby the separated saturated feed gas may be employed in the process, and the excess condensate may be recycled for mixing with said input feed gas, (d) and including said step of separating said process effluent, which consists of synthesis gas from a steam reforming plant, into dry synthesis gas and aqueous condensate, and boosting the pressure of said condensate for said mixing with input feed gas, (e) said (a) step mixing being carried out by providing multiple nozzles, and injecting said condensate through said nozzles to pass into multiple streams of said input feed gas.

2. The method of claim 1 wherein said input feed gas consists of natural gas.

3. The method of claim 1 wherein said process consists of steam reforming to which process said step (c) separated feed gas is supplied.

4. The method of claim 1 wherein said low or medium temperature fluid stream consists of products of combustion at temperatures between 350° F. and 800° F.

5. The method of claim 1 wherein the separated hydrocarbon feed gas is heated by said first fluid stream to between 500° and 750° F., and then passed to a high temperature desulfurizer in which sulfur is removed, the resultant hydrocarbon gas then being passed to a steam reformer process.

6. The method of claim 1 including the step of desulfurizing the supplied hydrocarbon feed gas.

7. The method of claim 1 including transfering heat from said first fluid stream to said hydrocarbon feed gas to raise the temperature thereof for desulfurization, and then desulfurizing the feed gas in a zinc oxide bed desulfurizer, prior to said mixing of the feed gas with condensate in step (a) of claim 1.

8. The method of any one of claims 2–4 and 5–7 including stripping overheads from a side stream of condensate, and condensing said overheads for mixing with said condensate.

9. The method of claim 1 including stripping overheads from a side stream of the condensate, and condensing said overheads for mixing with said condensate.

10. Apparatus for the recovery of low-level heat in steam reforming plants by saturating hydrocarbon gas feedstock with process condensate in a system, comprising means for maximizing heat recovery form low level heat sources in systems having only one temperature difference, by saturating hydrocarbon feedstock with process condensate, including;

(a) means for injecting process condensate through multiple nozzles into a tubular coil containing multiple streams of hydrocarbon gas feedstock;

(b) means for vaporizing all or part of the process condensate by the concurrent heating of the two-phase mixture of hydrocarbon feedstock and liquid in the tubular coil by heat transfer from a low-level heat source such as reformer furnace flue gas or shift reactor effluent;

(c) and means for separating the saturated hydrocarbon gas from excess liquid condensate, with the delivery of the saturated hydrocarbon gas to a steam reforming unit and recycle of excess liquid condensate to the process condensate system.

11. The invention of one of claims 1 or 10 wherein said process condensate comprises boiler feedwater.

12. In a system for recovering low level heat from a low or medium temperature first fluid stream, in conjunction with operation of a process employing input hydrocarbon feed gas and providing process effluent separable into process condensate and dry gas, the combination comprising: means for maximizing heat recovery form low level heat sources in systems having only one temperature difference, by saturating hydrocarbon feedstock with process condensate, including;
   (a) means mixing said condensate with said input feed gas and flowing the resultant two-phase mixture through a heat exchanger, said means including multiple nozzles through which condensate is injected to pass into multiple streams of said input feed gas,
   (b) means flowing said low or medium temperature fluid stream through said heat exchanger and transferring heat from said stream through a wall to said mixture, thereby to vaporize process condensate and to saturate the hydrocarbon feed gas in the mixture, said fluid stream consisting of flue gas at a temperature or temperatures between 350° F. and 800° F.,
   (c) means subsequently separating the saturated hydrocarbon feed gas from excess liquid condensate whereby the separated saturated feed gas may be employed in the process, and the excess condensate may be recycled for mixing with said input feed gas,
   (d) and including means separating said process effluent, which consists of synthesis gas from a steam reforming plant, into dry synthesis gas and aqueous condensate, and means boosting the pressure of said condensate for said (a) step mixing with input feed gas.

13. The system of claim 12 wherein the separated hydrocarbon feed gas is heated by said first fluid stream to between 300° F. and 750° F., and then passed to a high temperature desulfurizer in which sulfur is removed, the resultant hydrocarbon gas then being passed to a steam reformer process.

14. The system of claim 12 including means desulfurizing the supplied hydrocarbon feed gas.

15. The system of claim 14 wherein said last named means includes a zinc oxide bed desulfurizer treating the feed gas prior to mixing thereof with said condensate.

16. The system of claim 12 including means stripping overheads from a side stream of condensate, and condensing said overheads for mixing with said condensate.

* * * * *